UNITED STATES PATENT OFFICE.

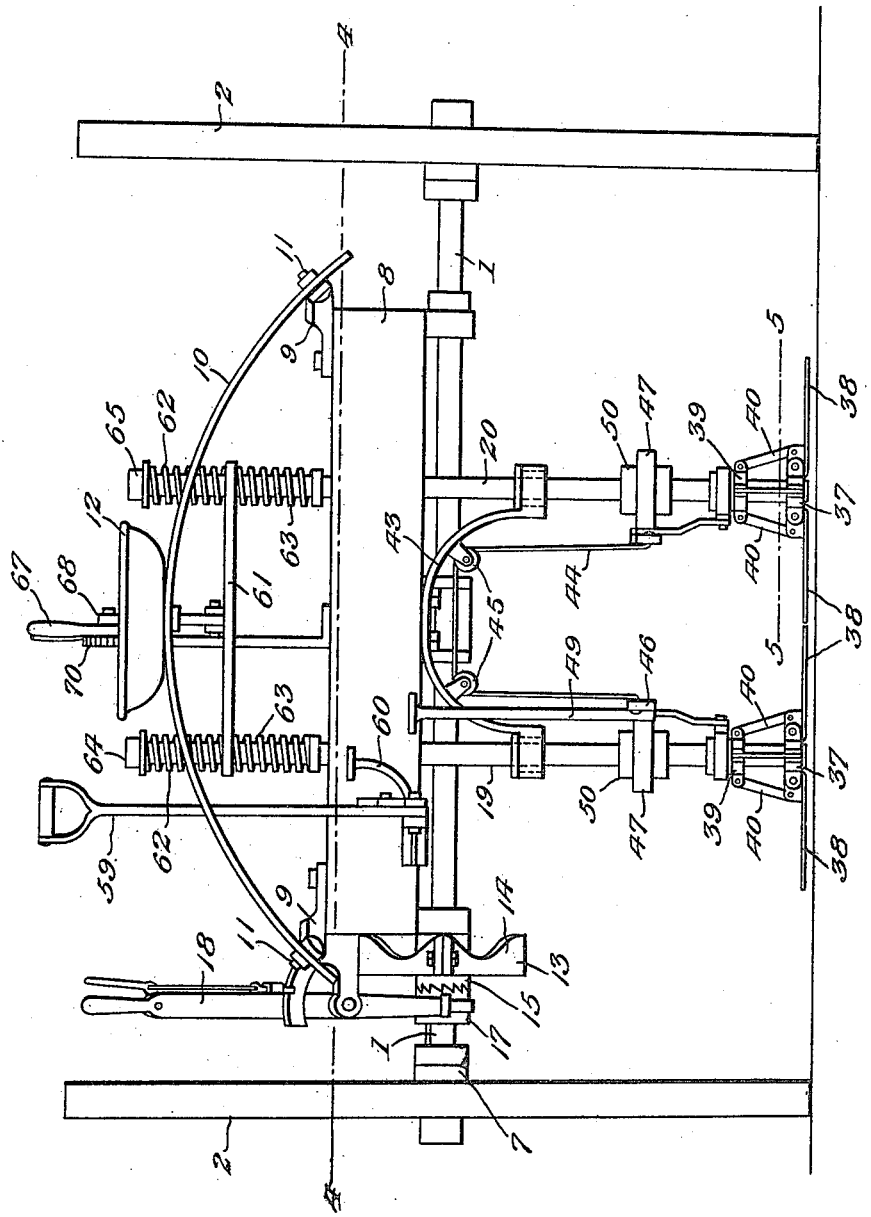

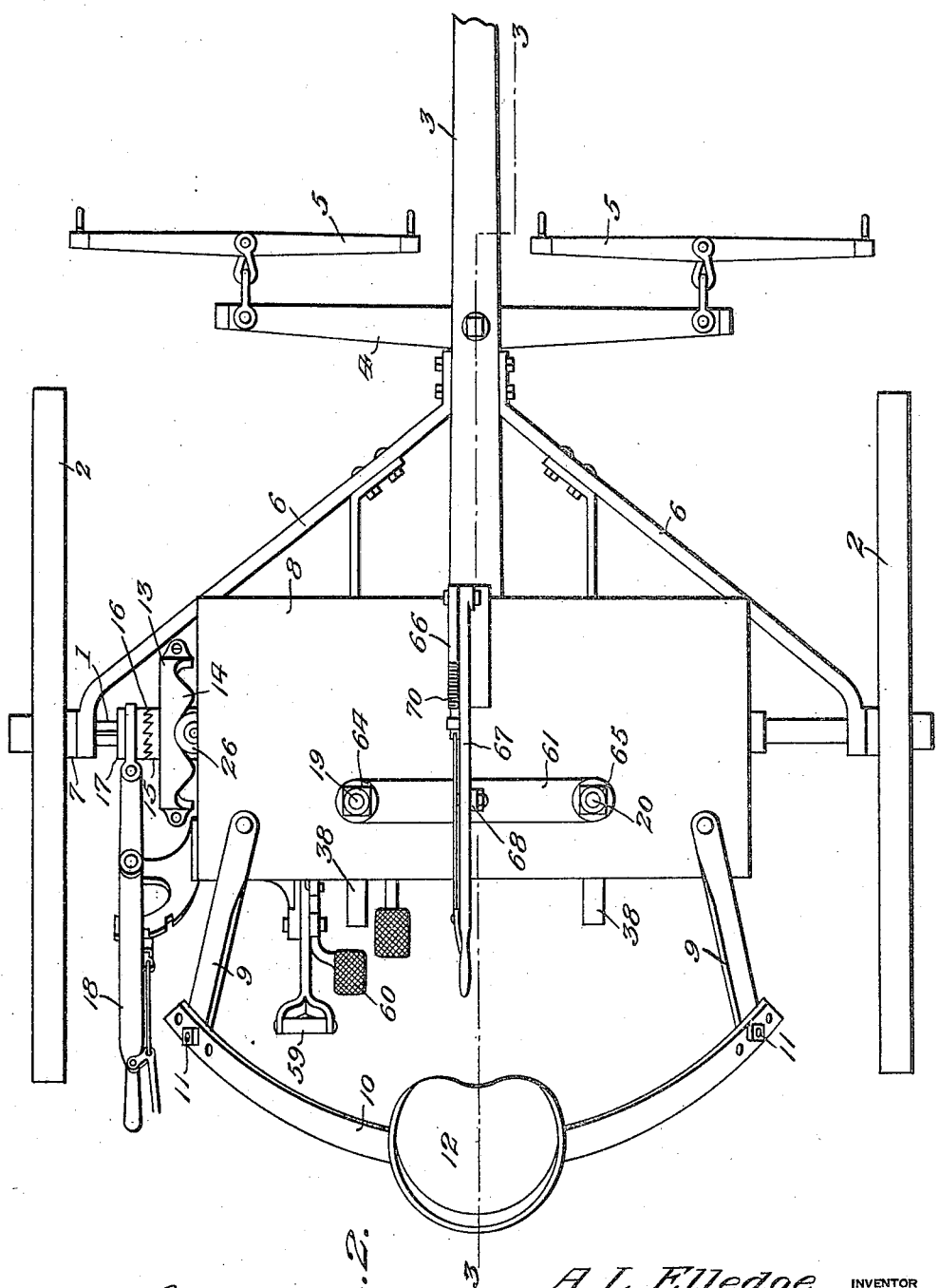

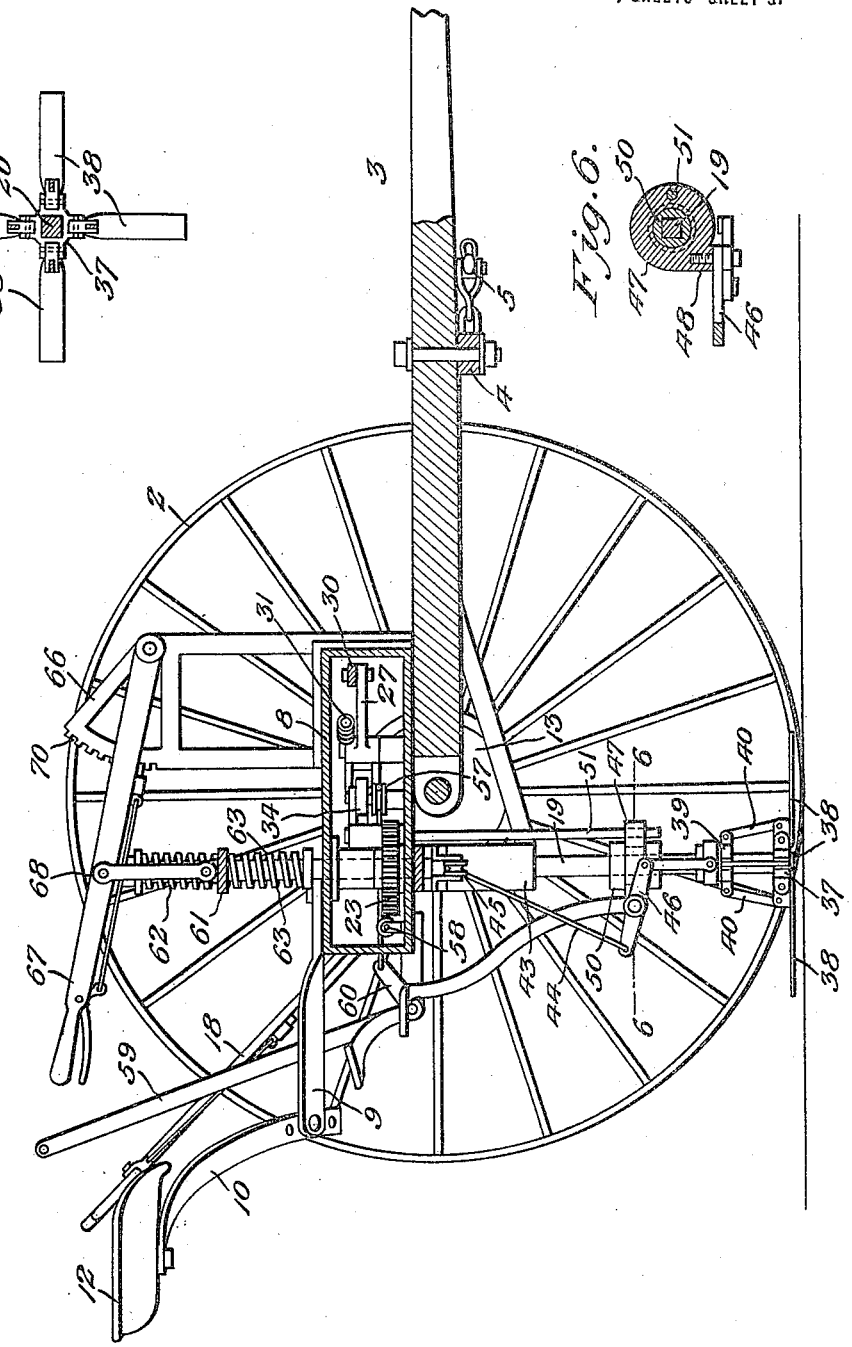

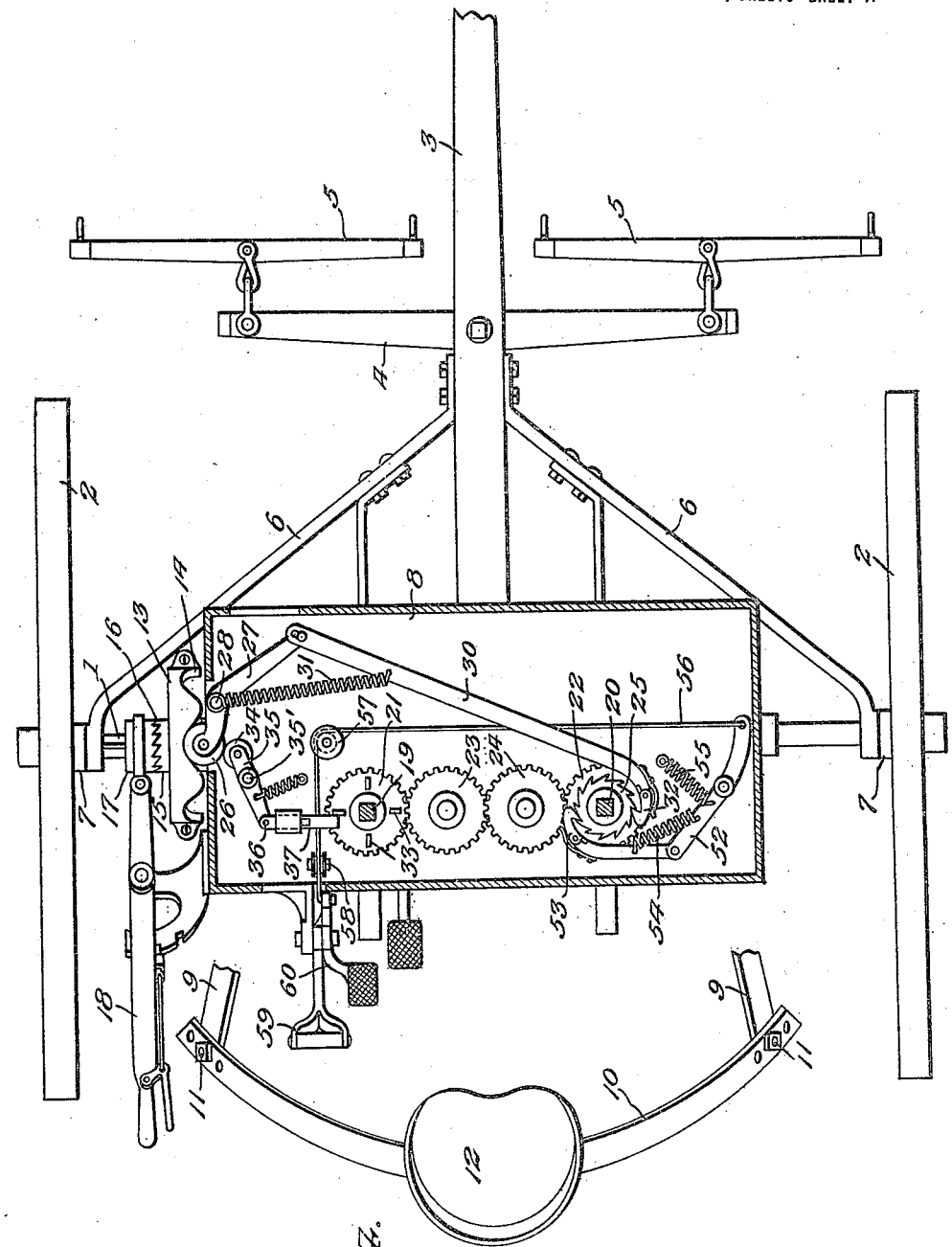

ARTHUR LEONARD ELLEDGE, OF DUNCAN, ARIZONA.

CULTIVATOR.

1,407,647.

Specification of Letters Patent. Patented Feb. 21, 1922.

Application filed February 23, 1921. Serial No. 447,025.

*To all whom it may concern:*

Be it known that I, ARTHUR L. ELLEDGE, a citizen of the United States, residing at Duncan, in the county of Greenlee and State of Arizona, have invented new and useful Improvements in Cultivators, of which the following is a specification.

This invention has reference to a hoeing and thinning cultivator.

The primary object of the invention is the production of a machine for this purpose in which horizontally disposed cutting knives are employed and motion imparted thereto for cutting weeds between rows of plants, and the said knives halted from movement and sustained out of contact with the plants when passing said plants.

It is a further object to produce a hoeing and thinning cultivator in which right angularly arranged cutting knives are carried by spaced shafts mounted on a wheeled body and revolved upon the turning of the wheels of the body, means being provided for halting or preventing the turning of the shafts and knives at determined intervals, whereby the knives may operate to cut foreign growths between rows of corn or the like and the knives be arranged to receive therebetween but in contact therewith the stalks of the plants, when the wheeled body moves past the plants, means being provided for swinging the knives to inactive position against their shafts, while also means is provided for holding the shafts against turning when the wheeled body is in motion.

The foregoing objects, and others which will appear as the nature of the invention is better understood, may be accomplished by a construction, combination and operative arrangement of parts such as is disclosed by the drawings which accompany and which form part of this application.

In the drawings—

Figure 1 is a rear elevation of a hoeing and thinning cultivator in accordance with this invention.

Figure 2 is a top plan view thereof.

Figure 3 is a sectional view approximately on the line 3—3 of Figure 2.

Figure 4 is a sectional view approximately on the line 4—4 of Figure 1.

Figure 5 is a sectional view approximately on the line 5—5 of Figure 1.

Figure 6 is a sectional view approximately on the line 6—6 of Figure 3.

While my improved hoeing and thinning means may be attached to the frame of an ordinary cultivator, I have shown the same in the accompanying drawings as a complete machine.

The improvement includes a frame on which is supported in suitable bearings a revolvable axle 1 to the ends of which ground wheels 2 are secured. From the frame there projects a tongue pole 3 provided with a double tree 4 carrying single trees 5, to which the draft animals are hitched. Brace members 6 are arranged between the sides of the tongue or pole 3, and suitable collars 7 on the axle 1 adjacent to the inner ends of the hubs of the ground wheels.

On the frame, above the axle 1, I secure a rectangular box like casing 8 that supports the elements for operating the knives.

Extending angularly from the frame are bars 9 on which rests an arcuate bar 10. The bars 9 are preferably pivoted to the frame, and the arcuate bar 10 has apertures adjacent to its ends through certain of which pass elements 10 that adjustably attach the bar 10 to the bar 9. On the bar 10 the seat 12 for the driver is arranged.

On the axle 1, adjacent to one of the ground wheels 2 and at one of the ends of the box like casing 8, there is a loosely mounted wheel 13 that has its inner face provided with spaced projecting lodes forming cam surfaces 14. The wheel has its opposite faces formed with a hub 15 that has a clutch surface 16 which is designed to be engaged by a clutch member 17, slidably splined on the axle 1 and movable by a suitable lever 18.

Passing through suitable bearing openings in the box 8 are vertically disposed knife carrying shafts 19 and 20 respectively. The shafts, for the major portion of their length are squared in cross section and the said squared portions pass through squared central openings in toothed wheels 21 and 22 respectively. The toothed wheels may have their hubs contacting with the upper and lower walls of the box, or the said hubs may have race ways therein for anti-frictional bars that engage race wheels in the top and bottom walls of the box. The wheels are held against vertical movement in the box, and mesh with idler toothed wheels 23 and 24 respectively.

Secured on the upper face of the toothed wheel 22 is a ratchet wheel 25.

The lodes or cams 15 on the wheel 13 are somewhat abrupt or pointed, while the curved depressions between the said cams are comparatively deep. In one of these depressions there is normally received a wheel or roller 26 journaled on one end of a rod 27 fulcrumed at 28 and having its outer end pivotally connected with an angularly disposed rod 30. Between the rods 27 and 30 there is a helical spring 31. The free end of the rod 30 is rounded upon itself to provide a hook 32 that engages with the teeth of the ratchet wheel 25. It will be apparent that when the ground wheels revolve the axle 1 and the cam wheel 13, the roller 26 being forced out of the grooves between the cams and against the pointed outer ends of the said cams, will swing the rod 27 on its fulcrum 28 and draw on the rod 30, to cause the hooked end 32 thereof to turn the ratchet wheel 25, consequently the wheel 22, the idlers 23 and 24, the wheel 21 and the knife shafts 19 and 20, will be turned one-fourth of a revolution. The arrangement of the gears on the shaft and the idler gears therebetween causes the shafts to turn in opposite directions, and consequently impart a like motion to the knives which are mounted on the shafts.

It is important that the shafts be held from accidental turning, except at desired and predetermined intervals. Such intervals are determined by arranging on the shaft 1 different sized wheels 13 having cams 14 varying in lengths and widths, the said wheels being preferably constructed in two sections so as to render the same interchangeable. To prevent the accidental turning of the shafts 19 and 20, I have arranged on the upper face of the toothed wheel 21 equi-distantly spaced lugs 33. Contacting with the roller 26 is a second roller 34. Connected to this roller is a crank arm 35 that has one of its straight portions journaled in a bearing 35′ and its second straight portion loosely received in a guide 36. The outer end of the crank member 35 is offset to provide a contact element 37; the rod is influenced by a spring to hold the roller 34 against the roller 26 and the contact element on the end of the rod out of engagement with the lugs 33. Thus when the cam wheel 13 forces the roller 26 outwardly the said roller will influence the rod and contact the element thereon to bring the same against one of the rods, preventing the free turning of the shafts. When the roller 26 is influenced by the spring 31 into one of the grooves between the cams 14 on the wheel 13 the spring which influences the contact or stop means will bring the latter out of contacting engagement with the lug 33, and thus permit of the turning of the shafts 19 and 20, as previously described.

On the lower squared ends of the shafts are sleeves 37 which may be provided with right angularly arranged outstanding lugs to which are pivotally connected the cutting elements or knives 38. It will be noted that each of the shafts carries four knives, and that the said knives are arranged at right angles with respect to each other. Thus the space between the knives provide a passage for the growth to be left standing, while weeds or other vegetation between the standing plants will be cut by the knives. The knives thus serve as both cutting and hoeing, and not only foreign growths are removed thereby but the rows of plants may be properly thinned.

On each of the shafts 19 and 20, above the sleeves 37 are collars 39 having loosely pivoted thereto depending angularly arranged links 40, one of such links being loosely connected with the respective knives 38.

The shafts 19 and 20 are sustained in spaced relation by an arched brace 43 that has a central portion secured to the frame of the machine and has suitable collars or sleeves that receive the shafts therethrough. To each of the collars 39 there is connected a flexible element 44 that is trained through pulleys 45 on the arched brace, that is also connected to an offset member in the nature of a lever 46. This lever has a connection with a slidable sleeve 47, the said sleeve having a projecting arm 48 that is connected with a lever 49 that has its hub portion provided with a round bore that receives the shafts 30 therethrough. In the bore of the hub is a washer 50 that has a squared bore to engage with the squared ends of the shafts. Depending from the collar 47 is a finger 51 that passes through an opening in the hub of the lever 49. Thus the lever may be revolved around the shafts 20, and in such movement will draw on the flexible element which will move the collars 39 upward on the shafts, drawing on the links 40 to cause the knives 38 to fold against the shafts. This is desirable when the machine is being transported or when not required for use.

When it is desired to manually operate the knives to either miss or cut irregular plants, the following means is employed. Pivoted in the box is a two-arm lever 52. The sections comprising the lever are pivotally associated, and on the outer or free arm or section of the levers there is pivoted a dog or hook 52 that is spring influenced to engage the teeth of the ratchet wheel 25. The arms of the lever 52 are swung toward each other by a spring 54, and the pivoted arm of the lever is swung in the direction of the ratchet wheel by a spring 55. To the free end of the last mentioned arm of the lever there is connected a cable 56. This cable is trained around a pulley 57 journaled adjacent to the toothed wheel 21, and over the guide 58 to a lever 59 and to a foot pedal 60. A pull on the cable, either by an operation of the lever 59 or the pedal 60 will cause the said cable to first raise the stop rod in its guide to bring the same out of the path of engagement with the lugs 33 on the wheel 21, and then to draw on the jointed lever 52, to swing the same on its pivot to cause the dog or hook 53 to turn the ratchet wheel 25 which turns the shaft 20, and through the medium of the toothed wheel 22, revolves the gears 23 and 24, causing the latter to rotate the wheel 22, and consequently revolve the shaft 19, thus causing the shafts to operate the knives.

To raise or lower the knives and the shafts 19 and 20, I provide a bar 61 that has its ends provided with openings for the shafts 19 and 20. Contacting with the opposite faces of the bar are compensating springs 62 and 63 respectively. On each of the shafts 19 and 20 there is secured preferably adjustable means 64 and 65 respectively which receive thereagainst the ends of the compensating springs 62 and 63. On the frame or on the box there is an upstanding element or standard 66 to which is pivoted a lever 67. This lever has a yoke 68 that receives therethrough the bar 61. It is evident that by swinging the lever in either direction the shafts and the elements carried thereby will be moved vertically. The springs release the shafts from being directly influenced by the rod or lever so that the said shafts may freely turn the wheel by which the lever is operated. The lever has an offset portion or toothed standard that is designed to engage with a rack 70 so that the shafts are thus sustained adjusted.

It is believed that the foregoing description, when taken in connection with the drawings will make clear to those skilled in the art to which this invention relates the construction and operation thereof, and while I have shown and described a satisfactory embodiment of the improvement as it now appears to me, it is to be understood that I am entitled to all such changes therefrom as fall within the scope of my claims.

What I claim is:

1. A wheeled frame, knives carried thereby, means actuated by the wheels of the frame for operating the knives and means for preventing such operation of the knives except at predetermined intervals.

2. A wheeled frame, knives carried thereby, each including opposed right angularly arranged cutting elements, means actuated by the turning of the wheels for revolving the knives, and means for preventing the turning of the knives except at predetermined intervals.

3. In a device for the purpose set forth, cooperating knives, means for revolving the knives in opposite directions toward each other, and means for preventing such operation at determined intervals.

4. A wheeled frame, vertically disposed shafts carried thereby, knives on the lower ends of said shafts each comprising right angularly disposed, cutting blades, means actuated by the turning of the wheels for revolving the shafts and knives, and means for holding the shafts against turning except at predetermined intervals.

5. A wheeled frame, vertically disposed shafts carried thereby, knives on the lower ends of the shafts, each comprising right angularly arranged cutting blades, means actuated by the turning of the wheels for revolving the shafts and knives, means for preventing the turning of the shafts except at predetermined intervals, and means for adjusting the shafts vertically on the frame.

6. A wheeled frame, vertically disposed shafts carried thereby, horizontally disposed knives on the lower ends of the shafts, means actuated by the turning of the wheels, for revolving the shafts and knives, means preventing the turning of the shafts except at predetermined intervals, means for vertically adjusting the shafts and knives, and means for folding the knives against the shafts.

7. A wheeled frame, vertically arranged shafts carried thereby, horizontally disposed knives on the lower ends of the shafts, brace means between the knives and shafts, means actuated by the turning of the wheels for revolving the shafts and knives, means preventing the turning of the shafts except at predetermined intervals, means for vertically adjusting the shafts and knives, and means for influencing the braces of the knives to move the latter on the shafts to cause the swinging of the knives against said shafts.

8. A wheeled frame, cooperating knives supported thereon, each comprising horizontally arranged right angularly disposed cutting blades, means for adjusting the knives vertically with respect to the frame, means actuated by the turning of the wheels for revolving the knives at predetermined intervals, means preventing turning of the knives except at such predetermined intervals, and manually operated means for rendering inactive the last mentioned means and for turning the knives independently of the wheel actuated means.

9. A wheeled frame, a wheel having one of its faces provided with spaced lodes forming cams freely mounted on the axle thereof, clutch means for locking the means to the axle, vertically arranged adjustable shafts journaled on the frame, toothed wheels keyed thereon and through which the shafts are vertically movable, toothed idlers between said first mentioned wheels, a ratchet wheel secured to one of the first mentioned wheels, lugs on the other first mentioned wheel, pivotally connected members, one fulcrumed on the frame and the other having a hooked end engaging the ratchet, spring means therebetween, a roller on the first mentioned member normally received between the lodes of the cam wheel, a spring influenced stop rod having a roller engaging the first mentioned roller designed to be brought opposite the mentioned lugs on one of the toothed wheels for holding the wheels against turning when the cam wheel and roller engaged therewith are in one position, spring influenced cable operated means also engaging the ratchet wheel and disposed to bring the stop rod out of lug engaging position, knives on the lower ends of the shafts each comprising right angular blades, and means for swinging the blades against the shafts.

In testimony whereof I affix my signature.

ARTHUR LEONARD ELLEDGE.